(12) United States Patent
Caspari et al.

(10) Patent No.: US 7,056,413 B2
(45) Date of Patent: Jun. 6, 2006

(54) ACRYLATE COPOLYMERS AND PRESSURE-SENSITIVE ADHESIVES OBTAINABLE THEREFROM FOR BONDING LOW-ENERGY SURFACES

(75) Inventors: Dirk Caspari, Neuwied (DE); Frank Kura, Meerbusch (DE); Mario Schutte, Koblenz (DE); Kurt Seeger, Neuwied (DE)

(73) Assignee: Lohmann GmbH & Co. KG, Neuwied (DE)

( * ) Notice: Subject to any disclaimer, the term of this patent is extended or adjusted under 35 U.S.C. 154(b) by 0 days.

(21) Appl. No.: 10/422,718

(22) Filed: Apr. 25, 2003

(65) Prior Publication Data

US 2003/0235686 A1 Dec. 25, 2003

(30) Foreign Application Priority Data

Apr. 26, 2002 (DE) ................................ 102 15 570

(51) Int. Cl.
*C08J 5/02* (2006.01)
(52) U.S. Cl. .................. 156/307.3; 156/332; 428/522; 526/214; 526/215; 526/216; 526/291; 526/306; 526/312
(58) Field of Classification Search ................ 526/291, 526/312, 214, 215, 216, 306; 156/307.3, 156/332; 428/522
See application file for complete search history.

(56) References Cited

U.S. PATENT DOCUMENTS

| | | | |
|---|---|---|---|
| 4,082,705 A * | 4/1978 | Beede et al. ................. | 525/213 |
| 4,198,238 A * | 4/1980 | Scheve .................... | 430/286.1 |
| 4,243,789 A | 1/1981 | Gilles | |
| 4,248,685 A * | 2/1981 | Beede et al. ................. | 526/220 |
| 4,404,345 A * | 9/1983 | Janssen ...................... | 526/206 |
| 4,452,955 A * | 6/1984 | Boeder ....................... | 525/518 |
| 4,500,608 A * | 2/1985 | Rametta ..................... | 428/522 |
| 4,726,982 A | 2/1988 | Traynor et al. | |
| 4,728,684 A | 3/1988 | Kadowaki et al. | |
| 4,994,538 A * | 2/1991 | Lee ............................ | 526/279 |
| 5,434,213 A | 7/1995 | Chen et al. | |
| 5,602,221 A * | 2/1997 | Bennett et al. .......... | 526/307.7 |
| 5,785,985 A * | 7/1998 | Czech et al. ................. | 424/448 |
| 5,817,426 A | 10/1998 | Spada et al. | |
| 5,840,783 A | 11/1998 | Momchilovich et al. | |
| 5,874,143 A | 2/1999 | Peloquin et al. | |
| 6,198,017 B1 * | 3/2001 | Basedow et al. ............. | 602/52 |
| 6,280,557 B1 | 8/2001 | Peloquin et al. | |

FOREIGN PATENT DOCUMENTS

WO WO 84/03837 * 10/1984

* cited by examiner

*Primary Examiner*—Bernard Lipman
(74) *Attorney, Agent, or Firm*—Birch, Stewart, Kolasch & Birch, LLP

(57) ABSTRACT

An acrylate copolymer for use in pressure-sensitive adhesives, particularly suitable for the bonding of low-energy surfaces, is composed of the following monomer components: A) 60 to 95% by weight of one or more monomers selected from alkyl acrylates and alkyl methacrylates, the alkyl containing 1 to 10 carbon atoms; B) 5 to 15% by weight of one or more monomers selected from esters of (meth)acrylic acid with a polyethylene glycol derivative having from 2 to 4 ethylene glycol units, the (meth)acrylic esters being free from hydroxyl groups; and C) 1 to 35% by weight of a mixture of at least two vinyl compounds selected from vinyl compounds which contain one or more of the following functional groups: free carbonyl groups, free carboxyl groups, groups having one or more active hydrogen atoms.

37 Claims, No Drawings

ACRYLATE COPOLYMERS AND PRESSURE-SENSITIVE ADHESIVES OBTAINABLE THEREFROM FOR BONDING LOW-ENERGY SURFACES

BACKGROUND OF THE INVENTION

1. Field of the Invention

The invention relates to acrylate copolymers having pressure-sensitive adhesion properties and to pressure-sensitive adhesives prepared on the basis of such acrylate copolymers. These acrylate copolymers and pressure-sensitive adhesives are especially suitable for bonding low-energy surfaces.

2. Description of the Related Art

A disadvantage of known, commercially available pressure-sensitive adhesives based on acrylate copolymers is their inadequate adhesion to substrate surfaces having a low surface energy. Critical, low-energy surfaces of this kind are encountered on numerous articles of everyday life, and also on construction elements or assembly components, for example in automotive engineering, in the furniture industry and the construction industry. Materials characterized by low-energy, apolar surfaces include not only polypropylene and polyethylene but also, in particular, ethylene-propylene-diene copolymers (EPDM), powder coatings, silicones, fluorocarbon-modified surfaces, and polytetrafluoroethylene (Teflon®).

Adhesives known to achieve effective adhesion even on low-energy surfaces include on the one hand pressure-sensitive adhesives based on natural rubber or synthetic rubber and on the other hand pressure-sensitive adhesives based on polysiloxanes. The possibilities for use of the pressure-sensitive adhesives, however, are very limited. Rubber-based pressure-sensitive adhesives are sensitive to exposure to oxygen, ozone and light owing to the presence of C=C double bonds. This results in a lack of (adequate) ageing stability. The use of pressure-sensitive polysiloxane adhesives is inappropriate for many applications owing to the high price.

It is known that the adhesion of pressure-sensitive polyacrylate adhesives to low-energy surfaces can be enhanced by adding tackifiers, such as tackifying resins, and/or plasticizers. However, additions of this kind have the drawback of an unfavourable effect on cohesion, ageing stability and temperature stability.

The patent literature has described a number of pressure-sensitive adhesives (PSAs) based on acrylate copolymers, aimed at enhancing the adhesion to low-energy surfaces.

U.S. Pat. No. 4,243,789 names N-vinylpyrrolidone and hydroxyl-containing monomers as adhesion-enhancing.

U.S. Pat. No. 4,726,982 describes PSAs based on crosslinked acrylate copolymers, synthesized from acrylic ester monomers and N-vinyllactam monomers. Additionally present are tackifying resins, such as poly(isobornyl methacrylate), for example.

U.S. Pat. No. 4,728,684 discloses acrylate-modified polyester urethanes and chlorinated rubbers which are crosslinked by isocyanate. This is said to enhance the adhesion to low-energy surfaces, e.g. PVC films.

U.S. Pat. No. 4,994,538 relates to PSAs which are prepared by emulsion polymerization and contain reactive silicone acrylate polymers in order to enhance the adhesion properties of these emulsion polymers.

U.S. Pat. Nos. 5,874,143 and 6,280,557 describe acrylate copolymer-based PSAs whose adhesion to low-energy surfaces is achieved through modification with resins and plasticizers.

U.S. Pat. No. 5,840,783 describes PSA compositions which comprise chlorinated polyolefins and exhibit enhanced adhesion to low-energy surfaces of plastics.

U.S. Pat. No. 5,434,213 describes copolymers of ethylene-vinyl acetate with acrylate monomers for use in PSAs which are suitable for the bonding of low-energy surfaces.

U.S. Pat. No. 5,602,221 relates to PSAs exhibiting enhanced adhesion to low-energy surfaces; these are copolymers of acrylic ester with a mixture of polar and apolar, ethylenically unsaturated monomers, the homopolymers of these monomers having different glass transition temperatures.

U.S. Pat. No. 5,817,426 discloses PSAs for low-energy surfaces, based on acrylate copolymers prepared by emulsion polymerization. The monomer mixture contains from 20 to 30% by weight of isobornyl acrylate, along with alkyl acrylate monomers. It is assumed that the isobornyl group influences the adhesion and rheology properties of the PSA; furthermore, it is mentioned that isobornyl acrylate homopolymers have a high glass transition temperature.

In practice it has been found to be the case that the increase in glass transition temperature ($T_g$) entailed for the use of isobornyl (meth)acrylate makes the adhesive product so hard that an adequate tack is achievable only by reducing the molecular weight. This molecular weight reduction, however, leads at the same time to a decrease in the shear strength and in the temperature stability.

None of the inventions described in the abovementioned documents, however, has led to an adhesive product which without the use of tackifiers and/or plasticizers achieves sufficient adhesion to the abovementioned critical, low-energy surfaces. As already mentioned, the use of such substances is associated with adverse effects.

SUMMARY OF THE INVENTION

It was an object of the present invention, therefore, to provide pressure-sensitively adhering polymers and pressure-sensitive adhesives based on acrylate copolymers which adhere to low-energy surfaces, which can be prepared inexpensively, and which are not hampered by the above-described drawbacks of the prior art. The intention is in particular to allow the adhesive properties to be improved without the addition of tackifying resins of plasticizers.

Surprisingly, this object is achieved by an acrylate copolymer having the monomer composition containing A) 160–95% by weight of one or monomers selected from alkyl acrylates or alkyl methacrylates, B) 5–15% by weight of one or monomers selected from esters of (meth)acrylic acid with a polyethylene glycol derivative, and C) 1–35% by weight of at least two vinyl compounds, and by pressure-sensitive adhesives prepared on the basis of the acrylate copolymers of the invention.

DETAILED DESCRIPTION

The acrylate copolymers of the invention are composed of the monomer components A, B and C, described below. The acrylate copolymers can be prepared by solution polymerization from the monomer mixture (components A, B and C). The stated percentages refer to the overall weight of the respective monomer mixture.

Monomer Component A:

From 60 to 95% by weight of one or more monomers from the group of the alkyl acrylates and alkyl methacrylates. The alkyl radical contains 1 to 10 carbon atoms; it can be unbranched or branched, linear or cyclic. Preference is given to using (meth)acrylates from the group consisting of methyl acrylate, n-butyl acrylate, tert-butyl acrylate, 2-ethylhexyl acrylate, isooctyl acrylate, isodecyl acrylate, isobornyl acrylate and isobornyl methacrylate.

Monomer Component B:

From 5 to 15% by weight of one or more monomers from the groups of the esters of (meth)acrylic acid with a polyethylene glycol derivative. The polyethylene glycol derivative is selected from the group of the polyethylene glycol derivatives having from 2 to 4 ethylene glycol units, the said (meth)acrylic esters being free of hydroxyl groups. Butoxydiethylene glycol methacrylate, ethoxytriethylene glycol methacrylate and triethylene glycol dimethacrylate are particularly preferred.

Monomer component C:

From 1 to 35% by weight and a mixture of at least two vinyl compounds selected from the group of vinyl compounds which contain one or more of the following functional groups: free carbonyl groups, free carboxyl groups, groups having one or more active hydrogen atoms. By "active hydrogen atoms" are meant hydrogen atoms which can be determined by gas volumetry in accordance with the method of Zerevitinov (Zerevitinov hydrogen). On reaction with a methylmagnesium iodide one mol of methane is obtained for each active hydrogen atom. Active hydrogen atoms are present, for example, in OH or $NH_2$ groups.

The vinyl compounds (component C) are preferably selected from the group consisting of acrylic acid, β-carboxyethyl acrylate, acrylamide, 2-hydroxyethyl acrylate acid ethylimidazolidone methacrylate.

Even as straight acrylics, i.e. without the addition of resins or plasticizers, the polymers of the invention are distinguished by enhanced adhesion on low-energy surfaces such as polyethylene, EPDM or Teflon® (see examples). The invention, however, also includes adhesive compositions which additionally include resins and/or plasticizers.

With the acrylate copolymers of the invention a plurality of relatively long-chain, flexible, physical linkage points are built into the polymer chain, and function in a variety of ways. Particular mention may be made here of linear or cyclic hydrogen bonds between carbonyl and/or carboxyl groups with groups containing active hydrogen atoms. Each of these linkages is effective on its own; however, it has proven to be particularly suitable if different such types of linkage are present in combination.

The said linkages improve the shear strength and the temperature stability without thereby entailing a substantial increase in the molecular weight, which would have adverse effects on the tack. The invention so makes it possible in particular to use isobornyl groups in poly(meth)acrylate PSAs while avoiding the drawbacks described above.

In accordance with one preferred embodiment of the invention it is envisaged that the acrylate copolymers are additionally crosslinked by chemical means, preferably by reaction with a crosslinker from the group consisting of acetylacetonates, titanates and compounds containing aziridine groups.

The invention further provides pressure-sensitive adhesives for the bonding of low-energy surfaces, these pressure-sensitive adhesives comprising one or more acrylate copolymers according to any of the preceding claims. These acrylate copolymers are preferably in dispersion or solution in a solvent or solvent mixture. Suitable solvents are known to the person skilled in the art; solvents particularly suitable are those from the group of the aliphatic hydrocarbons, alcohols, ketones, aldehydes, esters, ethers, and aromatic solvents, with particular preference from the group consisting of ethyl acetate, butyl acetate, acetone, toluene, xylene and cyclohexane. Ethyl acetate is most preferred. The polymer content of the pressure-sensitive adhesive is preferably from 0.5 to 95% by weight, more preferably from 30 to 75% by weight.

In accordance with further preferred embodiments of the invention it is envisaged that the pressure-sensitive adhesive is in the form of a film or a coat, for example in the form of a single-sided or double-sided adhesive tape or in the form of adhesive labels.

One or more additives may further be admixed to the pressure-sensitive adhesives of the invention in order to optimize the adhesion properties for specific applications. These additives are preferably from the group consisting of plasticizers and tackifying resins. Suitable plasticizers include in particular substances from the following group: phthalates, polyoxyethylene ethers, phosphate esters, sulphonamides.

Suitable tackifying resins include in particular: synthetic hydrocarbon resins, hydrogenated resin acids or their derivatives, especially esters of hydrogenated resin acids. The amount of the said additives can be between 0.1 and 30% by weight, preferably between 0.5 and 15% by weight.

The acrylate copolymers of the invention are illustrated by the examples below, which at the same time demonstrate the positive effect of the measures proposed in accordance with the invention.

Overview of the abbreviations used in the examples:

| Abbreviation | Monomer | Component |
|---|---|---|
| 2-EHA | 2-ethylhexyl acrylate | A |
| AA | Acrylamide | C |
| AS | acrylic acid | C |
| BA | butyl acrylate | A |
| BDGMA | butoxydiethylene glycol methacrylate | B |
| CEA | β-carboxyethyl acrylate | C |
| ET3EGMA | ethoxytriethylene glycol methacrylate | B |
| HEA | 2-hydroxyethyl acrylate | C |
| IDA | isodecyl acrylate | A |
| IOA | isooctyl acrylate | A |
| ISOBORA | isobornyl acrylate | A |
| MA | methyl acrylate | A |
| MEIO | ethylimidazolidone methacrylate | C |
| T3EGDMA | triethylene glycol dimethacrylate | B |
| TBA | tert-butyl acrylate | A |

Free-radical initiator

| AIBN | azo(bis)isobutyronitrile |
|---|---|

The polymerization reactions were performed in three-necked flasks of 2 l capacity which were equipped with heating bath, stirrer, reflux condenser and dropping funnel.

EXAMPLE 1

600 g of ethyl acetate were charged to the flask and brought to boiling under nitrogen. Then 600 g of a monomer mixture having the following composition were metered in at a uniform rate over the course of 1 h:

| Parts by weight | Monomer | Component |
| --- | --- | --- |
| 170 | 2-EHA | A |
| 6.6 | AA | C |
| 20 | AS | C |
| 190 | BA | A |
| 60 | BDGMA | B |
| 29.8 | HEA | C |
| 121 | ISOBORA | A |
| 0.7 | MA | A |
| 0.7 | MEIO | C |

The polymerization reaction was initiated by adding 1.2 parts by weight of AIBN as polymerization initiator.

The reaction mixture was stirred for a further 4 h, then cooled and mixed with 12 g of titanium acetylacetonate in solution in 228 g of ethyl acetate.

EXAMPLE 2

The reaction was carried out as described in Example 1, but following monomer composition:

| Parts by weight | Monomer | Component |
| --- | --- | --- |
| 270 | 2-EHA | A |
| 20 | AS | C |
| 70 | ET3EGMA | B |
| 195 | ISOBORA | A |
| 43 | MA | A |
| 0.5 | MEIO | C |
| 0.3 | T3EGDMA | B |

Polymerization initiator: 1.2 parts by weight of AIBN.

For crosslinking, 12 g of tetrabutyl titanate in solution in 228 g of ethyl acetate were added.

EXAMPLE 3

400 g of ethyl acetate, 200 g of acetone and 120 g of a monomer mixture whose composition was as indicated below were charged to a flask and brought to boiling under an inert gas atmosphere. Thereafter a further 480 g of the same monomer mixture were metered in over the course of 1 h. After a further 4 h the reaction mixture was cooled and 1.5 g of a crosslinker containing aziridine groups, in solution 28.5 g of ethyl acetate, were added.

| Parts by weight | Monomer | Component |
| --- | --- | --- |
| 260 | 2-EHA | A |
| 78 | BDGMA | B |
| 4 | CEA | C |
| 11.3 | HEA | C |
| 155 | ISOBORA | A |
| 90 | MA | A |
| 0.8 | MEIO | C |
| 0.9 | AIBN | initiator |

EXAMPLES 4 to 10

The acrylate copolymers of Examples 4 to 10 were prepared by the same method described in Example 3, in terms both of the polymerization reaction and of the crosslinking reaction.

The monomer compositions used for these examples can be seen from the table below:

Examples 4 to 10

| Example | 4 | 5 | 6 | 7 | 8 | 9 | 10 |
| --- | --- | --- | --- | --- | --- | --- | --- |
| Monomer | | | | | | | |
| 2-EHA | 408.00 | 240.00 | 468.00 | — | — | 120.00 | 60.00 |
| AA | — | 3.60 | 4.80 | 6.00 | 6.00 | 6.00 | — |
| AS | — | 15.00 | — | 6.00 | — | 18.00 | 4.20 |
| BA | — | 120.00 | — | — | — | 120.00 | 150.00 |
| BDGMA | 79.80 | 72.00 | — | — | — | — | 60.00 |
| CEA | 10.20 | — | 19.20 | 6.00 | 6.00 | 12.00 | 12.00 |
| ET3EGMA | — | — | — | 90.00 | — | 90.00 | 30.00 |
| HEA | 30.60 | 10.80 | 60.00 | 32.40 | 9.00 | — | 114.00 |
| IDA | — | — | — | — | 300.00 | — | — |
| IOA | — | — | — | 240.00 | — | — | — |
| ISOBORA | 63.00 | 105.00 | 30.00 | 60.00 | 240.00 | 78.00 | 120.00 |
| MA | 3.00 | 30.00 | 12.00 | 30.00 | 30.00 | 150.00 | 30.00 |
| MEIO | 3.00 | 2.40 | 4.80 | 12.00 | — | 4.80 | 6.00 |
| T3EGDMA | 1.20 | — | — | 3.00 | 6.00 | — | 12.00 |
| TEA | — | — | — | 114.00 | — | — | — |
| Initiator | | | | | | | |
| AIBN | 1.20 | 1.20 | 1.20 | 0.60 | 3.00 | 1.20 | 1.80 |

The PSA solutions prepared in accordance with Examples 1 to 10 were each applied with a doctorblade to a siliconized paper backing. The thickness in which they were applied was chosen so that 10 minutes' drying at 105° C. gave a PSA film having a weight per unit area of 65 g/m$^2$.

The PSA films thus produced were lined with a polyethylene terephthalate (PETP) sheet (23 µm thick), stored under standard conditions (23° C., 50% relative humidity) for 5 days and then tested in accordance with DIN EN 1939 for their peel strength on polyethylene (PE), EPDM (ethylene-propylene-diene monomer) and polytetrafluoroethylene (Teflon®). The testing of the shear strength in accordance with DIN EN 1943 was carried out on VA-grade (stainless) steel.

As comparative examples use was made of two standard PSAs (straight acrylics), which are referred to as "STD 1" and "STD 2":

STD 1: Durotak 480—1760 (National Starch & Chemical)
STD 2: Applicant's in-house polymer

| Ex. | 1 | 2 | 3 | 4 | 5 | 6 | 7 | 8 | 9 | 10 | STD 1 | STD 2 |
|---|---|---|---|---|---|---|---|---|---|---|---|---|
| Peel strength to DIN EN 1939 | | | | | | | | | | | | |
| PE | 4.0 | 4.5 | 4.8 | 9.8 | 6.5 | 6 | 5.7 | 3.5 | 4.2 | 3.8 | 3.6 | 2.6 |
| EPDM | 10 | 10.2 | 13 | 14.5 | 12.8 | 13 | 10 | 8.2 | 12 | 8 | 4.1 | 6.2 |
| Teflon ® | 3 | 3.2 | 4.1 | 8.1 | 5.1 | 6.1 | 4.6 | 4.6 | 7.0 | 3.5 | 3.3 | 5.0 |
| Shear strength to DIN EN 1943 | | | | | | | | | | | | |
| | 25 | 25 | 25 | 30 | 30 | 40 | 50 | 40 | 50 | 80 | 80 | 60 |

In view of the enhanced adhesion to low-energy surfaces, the pressure-sensitively adhering acrylate copolymers and pressure-sensitive adhesives of the invention are excellently suited to applications in automotive, vehicle and aircraft construction, in the construction industry and furniture industry, and in many other instances where at least one of the adherents has a low surface energy.

The invention claimed is:

1. An acrylate copolymer for use in pressure-sensitive adhesives, comprising monomer components A, B and C:
    A) from 60 to 95% by weight of one or more monomers selected from the group consisting of alkyl acrylates and alkyl methacrylates, the alkyl radical containing 1 to 10 carbon atoms;
    B) from 5 to 15% by weight of one or more monomers selected from esters of (meth)acrylic acid with a polyethylene glycol derivative selected from polyethylene glycol derivatives having from 2 to 4 ethylene glycol units, said (meth)acrylic esters being free from hydroxyl groups; and
    C) from 1 to 35% by weight of a mixture of at least two vinyl compounds selected from vinyl compounds which contain one or more of the following functional groups: free carbonyl groups, free carboxyl groups, or groups having one or more active hydrogen atoms.

2. The acrylate copolymer according to claim 1, wherein at least one of the monomer components A is/are selected from the group consisting of methyl acrylate, n-butyl acrylate, tert-butyl acrylate, 2-ethylhexyl acrylate, isooctyl acrylate, isodecyl acrylate and isobornyl (meth)acrylate.

3. The acrylate copolymer according to claim 1, wherein the monomer component(s) B is/are selected from the group consisting of butoxydiethylene glycol methacrylate, ethoxytriethylene glycol methacrylate and triethylene glycol dimethacrylate.

4. The acrylate copolymer according to claim 1, wherein said acrylate copolymer is prepared by polymerizing the monomer components in a solvent or solvent mixture.

5. The acrylate copolymer according to claim 1, wherein said acrylate copolymer is crosslinked chemically.

6. A pressure-sensitive adhesive for the bonding of low-energy surfaces, which comprises one or more acrylate copolymers according to claim 1.

7. The pressure-sensitive adhesive according to claim 6, wherein said acrylate copolymer(s) is/are in dispersion or solution in a solvent or solvent mixture.

8. The pressure-sensitive adhesive according to claim 7, wherein the polymer content of the adhesive is from 0.5 to 95% by weight.

9. The pressure-sensitive adhesive according to claim 6, wherein said pressure-sensitive adhesive is present as a film or coat.

10. The pressure-sensitive adhesive according to claim 6, wherein the pressure-sensitive adhesive further comprises one or more additives.

11. A method for producing a pressure-sensitive adhesive film or adhesive tape comprising coating a film substrate with the acrylate copolymer of claim 1.

12. A method for producing a pressure-sensitive adhesive film or adhesive tape comprising coating a film substrate with the pressure-sensitive adhesive of claim 6.

13. The acrylate copolymer according to claim 5, wherein said acrylate copolymer is crosslinked chemically by reaction with a crosslinker selected from the group consisting of acetylacetonates, titanates and compounds containing aziridine groups.

14. The pressure-sensitive adhesive according to claim 7, wherein said solvent or solvent mixture is at least one solvent selected from the group consisting of aliphatic hydrocarbons, alcohols, ketones, aldehydes, esters, ethers and aromatic solvents.

15. The pressure-sensitive adhesive according to claim 7, wherein said solvent or solvent mixture is at least one solvent selected from the group consisting of ethyl acetate, butyl acetate, acetone, toluene, xylene and cyclohexane.

16. The pressure-sensitive adhesive according to claim 7, wherein said polymer content of the adhesive is from 30 to 75% by weight.

17. The pressure-sensitive adhesive according to claim 10, wherein said additives are selected from the group consisting of plasticizers and tackifying resins.

18. The acrylate copolymer according to claim 1, wherein an adhesive prepared from the copolymer adheres to low energy surfaces.

19. An acrylate copolymer for use in pressure-sensitive adhesives, comprising monomer components A, B and C:
    A) from 60 to 95% by weight of one or monomers selected from the group consisting of alkyl acrylates and alkyl methacrylates, the alkyl radical containing 1 to 10 carbon atoms;
    B) from 5 to 15% by weight of one or more monomers selected from esters of (meth)acrylic acid with a polyethylene glycol derivative selected from polyethylene glycol derivatives having from 2 to 4 ethylene glycol units, said (meth)acrylic esters being free from hydroxyl groups; and
    C) from 1 to 35% by weight of a mixture of at least two vinyl compounds selected from the group consisting of β-carboxyethyl acrylate, 2-hydroxyethyl acrylate and ethylimidazolidone methacrylate.

20. The acrylate polymer according to claim 1, wherein the vinyl compounds C are selected from the group consisting of acrylic acid, β-carboxyethyl acrylate, acrylamide, 2-hydroxyethyl acrylate and ethylimidazolidone methacrylate.

21. The acrylate copolymer according to claim 19, wherein at least one of the monomer components A is selected from the group consisting of methyl acrylate, n-butyl acrylate, tert-butyl acrylate, 2-ethylhexyl acrylate, isooctyl acrylate, isodecyl acrylate and isobornyl (meth)acrylate.

22. The acrylate copolymer according to claim 19, wherein at least one monomer component B is selected from the group consisting of butoxydiethylene glycol methacrylate, ethoxytriethylene glycol methacrylate and triethylene glycol dimethacrylate.

23. The acrylate copolymer according to claim 19, wherein said acrylate copolymer is prepared by polymerizing the monomer components in a solvent or solvent mixture.

24. The acrylate copolymer according to claim 19, wherein said acrylate copolymer is crosslinked chemically.

25. A pressure-sensitive adhesive for the bonding of low-energy surfaces, which comprises one or more acrylate copolymers according to claim 19.

26. The pressure-sensitive adhesive according to claim 25, wherein said acrylate copolymer(s) is in dispersion or solution in a solvent or solvent mixture.

27. The pressure-sensitive adhesive according to claim 26, wherein the polymer content of the adhesive is from 0.5 to 95% by weight.

28. The pressure-sensitive adhesive according to claim 25, wherein said pressure-sensitive adhesive is present as a film or coat.

29. The pressure-sensitive adhesive according to claim 25, wherein the pressure-sensitive adhesive further comprises one or more additives.

30. A method for producing a pressure-sensitive adhesive film or adhesive tape comprising coating a film substrate with the acrylate copolymer of claim 19.

31. A method for producing a pressure-sensitive adhesive film or adhesive tape comprising coating a film substrate with the pressure-sensitive adhesive of claim 25.

32. The acrylate copolymer according to claim 24, wherein said acrylate copolymer is crosslinked chemically by reaction with a crosslinker selected from the group consisting of acetylacetonates, titanates and compounds containing aziridine groups.

33. The pressure-sensitive adhesive according to claim 26, wherein said solvent or solvent mixture is at least one solvent selected from the group consisting of aliphatic hydrocarbons, alcohols, ketones, aldehydes, esters, ethers and aromatic solvents.

34. The pressure-sensitive adhesive according to claim 26, wherein said solvent or solvent mixture is at least one solvent selected from the group consisting of ethyl acetate, butyl acetate, acetone, toluene, xylene and cyclohexane.

35. The pressure-sensitive adhesive according to claim 27, wherein said polymer content of the adhesive is from 30 to 75% by weight.

36. The pressure-sensitive adhesive according to claim 29, wherein said additives are selected from the group consisting of plasticizers and tackifying resins.

37. The acrylate copolymer according to claim 19, wherein an adhesive prepared from the copolymer adheres to low energy surfaces.

* * * * *